Figure 4:
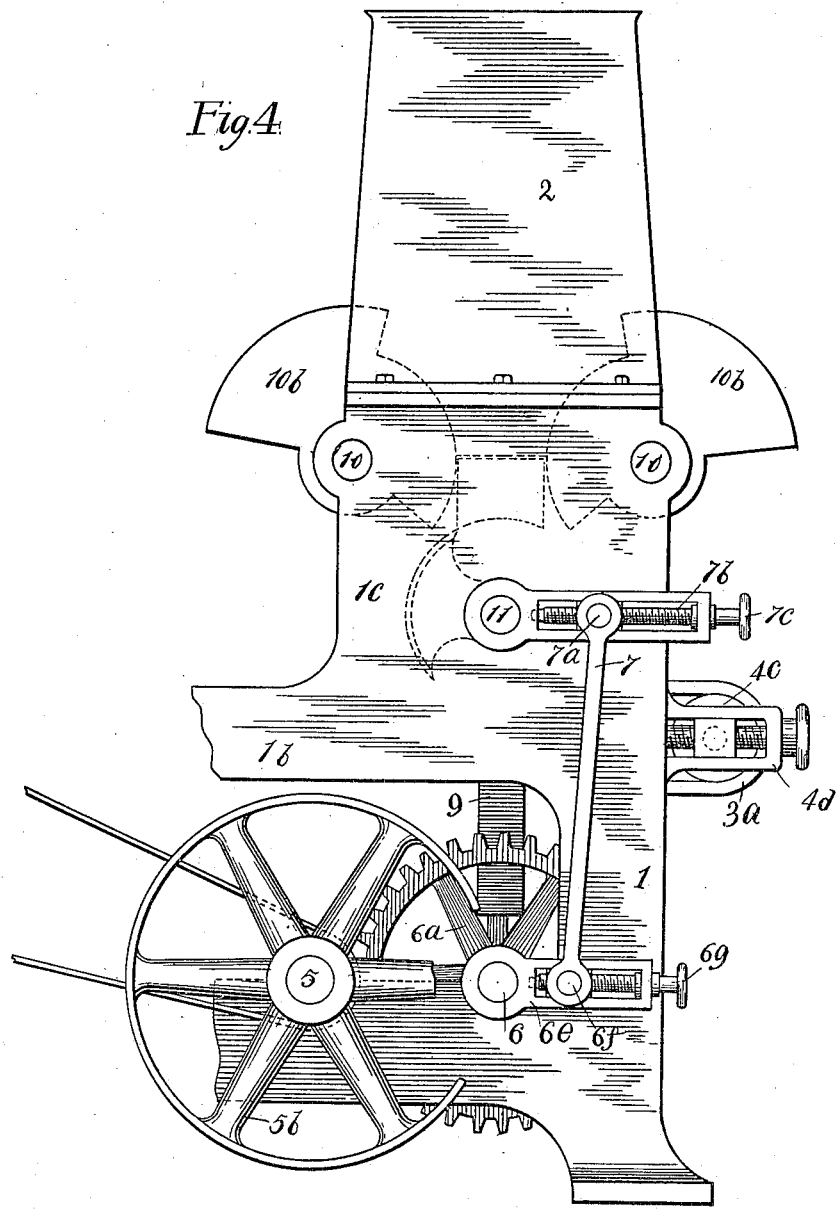

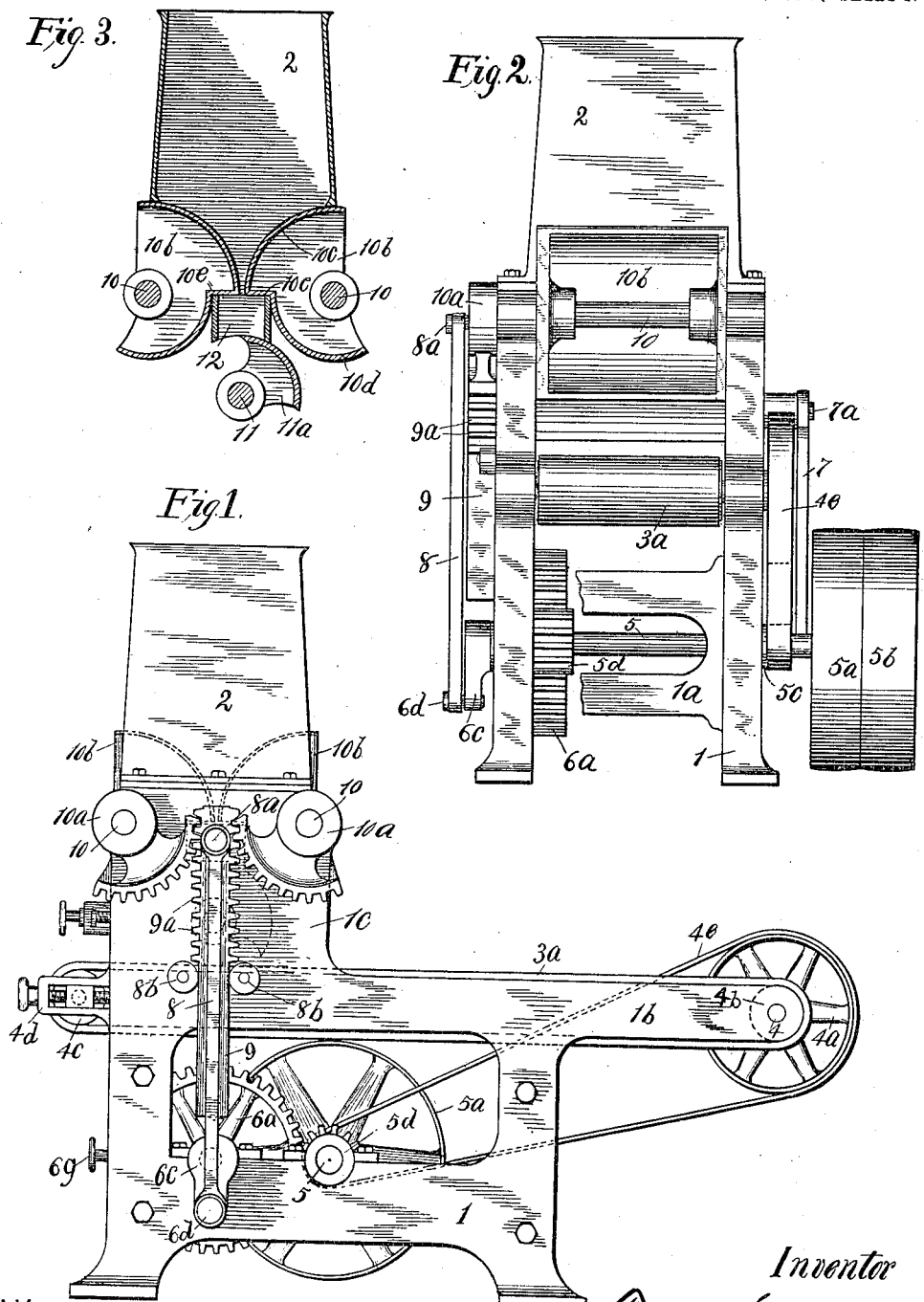

No. 824,959. PATENTED JULY 3, 1906.
F. STREICH.
DOUGH DIVIDER.
APPLICATION FILED JULY 27, 1905.

2 SHEETS—SHEET 2.

Witnesses:
Chas. F. Bassett
M. A. Milard

Inventor
Frank Streich
By Frederick Benjamin
Atty.

UNITED STATES PATENT OFFICE.

FRANK STREICH, OF CHICAGO, ILLINOIS, ASSIGNOR TO PHIL F. CARROLL, OF JOLIET, ILLINOIS.

DOUGH-DIVIDER.

No. 824,959.      Specification of Letters Patent.      Patented July 3, 1906.

Application filed July 27, 1905. Serial No. 271,431.

*To all whom it may concern:*

Be it known that I, FRANK STREICH, a citizen of the United States, residing at Chicago, in the county of Cook and State of Illinois, have invented certain new and useful Improvements in Dough-Dividers, of which the following is a specification.

This invention relates to improvements in machines for dividing masses of dough into lumps suitable for forming loaves of bread and the like.

The especial object of the improvements described in this application is to produce a machine of the simplest mechanical construction that will accurately and effectively divide the dough without impairment of the material and that will handle the material with minimum contact with the mechanism of the machine.

In the accompanying drawings, which form a part of this application, Figure 1 is a side elevation of my dough-divider in an approved form. Fig. 2 is an end elevation of the same. Fig. 3 is a detail in vertical section, showing the hopper and parts contiguous thereto. Fig. 4 is a side elevation of the machine, taken from the side opposite to that shown in Fig. 1 and on a larger scale.

Referring to the details of the drawings, 1 represents the main frame of my improved machine, which is provided with braces $1^a$, horizontal extension $1^b$, and a vertical extension $1^c$.

2 represents a hopper, which is bolted to the extension $1^c$ and is open at the top and bottom.

4 is a shaft suitably journaled at the outer end of the extension $1^b$, on which is fixed a roller $4^b$, and on the outer end of the shaft 4 is mounted a pulley $4^a$, over which travels an endless belt $4^e$. A similar shaft and a roller $4^c$ are mounted at the opposite end of the machine in a bearing-block adjustably mounted in the bracket $4^d$ in the usual manner. An endless apron $3^a$ is arranged over the said rollers and forms the table of the machine.

5 is a shaft suitably journaled in the frame 1, and on the outer end of the shaft are mounted tight and loose pulleys $5^a$ $5^b$, respectively. A small belt-wheel $5^c$ is secured on the shaft 5 outside of the frame and near the pulley $5^a$, and the belt $4^e$ is arranged over said wheel, as shown in Fig. 2. A pinion $5^d$ is mounted on the shaft 5 and meshes with and drives the gear-wheel $6^a$, which is mounted near one end of the shaft 6, said shaft being suitably journaled in the frame and carrying at its end adjacent to the gear $6^a$ an arm $6^c$, in which a pin $6^d$ is secured. Mounted on one end of the shaft 6 is an arm $6^e$, carrying a block that is adjustable in said arm by the bolt $6^g$. Projecting from the block is a pin $6^f$, on which is pivoted the lower end of a rod 7, the upper end of which is similarly connected with a pin $7^a$, which projects from a block mounted in the arm $7^b$, which is provided with the adjusting-bolt $7^c$. Said arm is pivotally mounted on the shaft 11, which is suitably journaled in the extension $1^c$ of the main frame of the machine. Said shaft 11 has secured thereon a cut-off $11^a$, formed with a curved face, as shown in Fig. 3.

8 represents a rod the lower end of which is loosely mounted on the pin $6^d$, and the upper end is pivotally connected by a pin $8^a$ with the rack-bar 9, the teeth $9^a$ of which are formed on the opposite edges of the bar, as shown in Figs. 1 and 2. The plain portion of the rack-bar is slidably mounted between the guide-rollers $8^b$, which are mounted on pins projecting from the side of the frame, as shown in Fig. 1.

10 10 represent shafts which are journaled in the extension $1^c$ and have mounted at one end segmental gears $10^a$, the teeth of which mesh with the teeth $9^a$ of the rack-bar. On said shafts are also fixed the dough-feeding elements $10^b$ $10^b$, which are formed with curved faces $10^c$ $10^d$ and the squared face $10^e$ and are so mounted as to form oscillating gates for the lower end of the hopper 2, as clearly shown in Fig. 3. Secured between the frame extensions $1^c$ is a dough-receiving box 12, which is open at the top and bottom and has its upper edges squared to abut against the squared portions $10^e$ of the elements $10^b$ and its lower edges curved to fit the curved face of the cut-off $11^a$. The faces $10^c$ $10^d$ of the elements $10^b$ are formed at different radii, so that when the faces $10^c$ are in the position shown in Fig. 3 they practically close the lower end of the hopper; but when said elements have been oscillated on the shaft 10 to the position shown in Fig. 4 they will permit the dough to feed down into the box 12.

The operation of a machine constructed substantially as described will be as follows: Power being applied to the pulley 5ª, the shaft 5 will be driven and in turn will rotate the belt-wheel 5ᶜ and the pinion 5ᵈ. Through the belt 4ᵉ the wheel 5ᶜ will drive the pulley 4ª, and thus through the rollers 4ᵇ 4ᶜ drive the apron 3ª. The pinion 5ᵈ will drive the gear-wheel 6ª and the shaft 6, on which it is mounted, and will thus rotate the arm 6ᵉ and drive the rod 7, and through said rod the arm 7ᵇ will be oscillated and cause like movement in the shaft 11 and cut-off 11ª. The shaft 6 will also rotate the arm 6ᶜ, and thus drive the rod 8, which in turn will reciprocate the rack-bar in a vertical plane, and thus through the segments 10ª oscillate the elements 10ᵇ. Assuming that the hopper is filled with dough, a certain amount of the material will be forced downwardly by the squared faces 10ᵉ of the elements 10ᵇ into the box or receptacle 12. The stroke of the elements 10ᵇ regulates the amount of dough fed down into the box, and this stroke is adjustably controlled through the position of the segmental gears on their respective shafts relative to the position of the said elements on the same shafts. The dough by reason of its nature will remain in the box 12 until forced out, and this is done by the next following lump of dough in connection with the cut-off, which severs the first lump and permits gravity to act. The lumps first formed will not be accurately scaled; but after a few operations and the proper adjustment of the connections of the rod 7 the amount of dough entering the box 12 at each downward movement of the shoulders 10ᵉ will be uniform.

Having thus described my invention, what I claim as new, and desire to secure by Letters Patent, is—

1. In a dough-divider, a supporting-frame and a hopper secured thereon, a dough-receptacle arranged below said hopper, oscillating dough-feeding elements mounted in the lower portion of the hopper, said elements having faces adapted to force a portion of the dough into said receptacle, means for operating said dough-feeding elements, and a cut-off for the dough.

2. In a dough-divider, a supporting-frame and a hopper secured thereon, oscillating dough-feeding elements mounted in the lower portion of the hopper, said elements adapted to force a portion of the dough downwardly, a dough-receptacle arranged below the hopper and adapted to receive the dough therefrom, means for operating said dough-forcing elements, an oscillating cut-off arranged below said receptacle, and means for operating said cut-off.

3. In a dough-divider, a supporting-frame, and a hopper secured thereto, oscillating dough-feeding elements mounted in the lower portion of the hopper, said elements adapted to force a portion of the dough downwardly, and to form a closure against the rest of the dough in the hopper, a receptacle adapted to receive the dough from the hopper, means for operating said dough-forcing elements, an oscillating cut-off arranged below said receptacle and means for operating said cut-off.

4. In a dough-divider, a supporting-frame and a hopper secured thereto, oscillating dough-feeding elements 10ᵇ mounted in the lower portion of the hopper, a receptacle arranged below said elements and adapted to receive portions of the dough from the hopper, the cut-off 11ª, means for operating the dough-feeding elements and means for operating the cut-off.

In testimony whereof I affix my signature in presence of two witnesses.

FRANK STREICH.

Witnesses:
H. DeLos Higman,
F. Benjamin.